United States Patent
Berroteran et al.

(10) Patent No.: US 11,368,023 B2
(45) Date of Patent: Jun. 21, 2022

(54) DUAL-SAMPLING MAXIMUM POWER POINT TRACKING WITH DYNAMIC POWER LIMITING FOR POWER SYSTEMS

(71) Applicants: General Electric Company, Schenectady, NY (US); Igor Berroteran, Salem, VA (US); Shouzhong Chang, Shanghai (CN)

(72) Inventors: Igor Berroteran, Salem, VA (US); Shouzhong Chang, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/982,849

(22) PCT Filed: Mar. 22, 2018

(86) PCT No.: PCT/CN2018/079933
§ 371 (c)(1),
(2) Date: Sep. 21, 2020

(87) PCT Pub. No.: WO2019/178795
PCT Pub. Date: Sep. 26, 2019

(65) Prior Publication Data
US 2021/0057915 A1    Feb. 25, 2021

(51) Int. Cl.
*H02J 3/38* (2006.01)
*F03D 9/00* (2016.01)

(52) U.S. Cl.
CPC ............ *H02J 3/381* (2013.01); *F03D 9/007* (2013.01); *F05B 2220/708* (2013.01);
(Continued)

(58) Field of Classification Search
CPC .... H02J 3/381; H02J 2300/28; H02J 2300/26; H02J 2300/40; F03D 9/007; F05B 2220/708
See application file for complete search history.

(56) References Cited

U.S. PATENT DOCUMENTS

| 8,339,112 | B2 | 12/2012 | Rua et al. |
| 2009/0121549 | A1* | 5/2009 | Leonard ............ H02J 3/381 307/51 |
| 2012/0091817 | A1 | 4/2012 | Seymour et al. |

FOREIGN PATENT DOCUMENTS

| CN | 202183609 U | 4/2012 |
| CN | 104868495 A | 8/2015 |
| CN | 105259971 A | 1/2016 |

(Continued)

OTHER PUBLICATIONS

PCT International Search Report Corresponding to PCT/CN2018/079933 dated Dec. 27, 2018.
(Continued)

*Primary Examiner* — Carlos Amaya
(74) *Attorney, Agent, or Firm* — Dority & Manning, P.A.

(57) ABSTRACT

A method for operating a PV system that is integrated into a power system connected to a power grid includes determining a voltage operating point for the PV system based on a maximum power point tracking (MPPT) algorithm. If an available power output of the PV system can be provided to the power grid, the method includes operating the PV system based on the voltage operating point. If the maximum available power output of the PV system cannot be provided to the power grid, the method includes applying a voltage step to the voltage operating point to drive a power output of the PV system towards an external power constraint.

20 Claims, 8 Drawing Sheets

(52) U.S. Cl.
CPC ....... *H02J 2300/26* (2020.01); *H02J 2300/28* (2020.01); *H02J 2300/40* (2020.01)

(56) References Cited

FOREIGN PATENT DOCUMENTS

| CN | 106 786 804 A | 5/2017 |
|---|---|---|
| EP | 2290784 A2 | 3/2011 |
| EP | 2722725 B1 | 5/2017 |
| WO | WO2008/029711 A1 | 3/2008 |
| WO | WO2011/109514 A1 | 9/2011 |
| WO | WO 2017/056114 A1 | 4/2017 |

OTHER PUBLICATIONS

Sera, et al., Improved MPPT Algorithms for Rapidly Changing Environmental Conditons, Power Electronics and Motion Control Conference, 2006. EPE-PEMC 2006. 12th International Aug. 30, 2006, pp. 1614-1619. https://www.researchgate.net/publication/224382879_Improved_MPPT_Algorithms_for_Rapidly_Changing_Environmental_Conditions?enrichID=rgreq-917bdf9219c567dbb3cbc57bfd1cf036-XXX&enrichSource=Y292XJQYWdlOzlyNDM4Mjg3OTtBUzo5ODQlNjkyNDMyNzk1MUAxNDAwNDg1MzY4OTg2&el=1_x_2&_esc=publicationCoverPdf.

Shen, et al., Evaluation of a Dynamic Dual-Sampling Maximum Power Point Tracker for Central PV Inverters, GE Global Research, 25th European Photovoltaic Solar Energy Conference and Exhibition, 5th World Conference, Sep. 5-10, 2010, Valencia Spain, pp. 4497-4501.

EPO Search Report, dated Sep. 6, 2021.

\* cited by examiner

DUAL-SAMPLING MAXIMUM POWER POINT TRACKING WITH DYNAMIC POWER LIMITING FOR POWER SYSTEMS

FIELD

The present subject matter relates generally to maximum power point tracking for hybrid power systems and, more particularly, to methods for dual-sampling maximum power point tracking for photovoltaic cells of such hybrid power systems with dynamic power limiting.

BACKGROUND

Renewable power sources such as photovoltaic (PV) cells can be integrated into other power generation applications, such as wind turbines, to form a hybrid power system. The PV power converter receives input current at a low voltage and produces an output current at a higher voltage that can be used to generate supplemental power for the system.

Such power systems may utilize a maximum power point tracking (MPPT) algorithm to maximize power extraction under all conditions. More specifically, PV cells have a special non-linear IN-curve and therefore a nonlinear P/V-curve as well. An example P/V curve is illustrated in FIG. 1. As shown, the maximum of the P/V curve coincides with the maximum power point (MPP) of the cell. Thus, the PV cell delivers maximum power only when working at this operating point. The MPP can rapidly shift due to changing weather conditions, thereby leading to poor module efficiency. Because of the dynamic nature of the MPP, PV cells require active adjustment of electrical operating conditions in order to maintain maximum power output. The main goal for adjusting operating conditions of the PV cell is to track the MPP of the cell, hence the term "maximum power point tracking" that is commonly used to describe this functionality.

Perturb and Observe (P&O) is the most commonly used MPPT algorithm in such power systems due to its easy implementation. In the P&O method, the system controller adjusts the voltage applied to the PV array by a small amount and measures power; if the power increases, further adjustments in that direction are tried until power no longer increases. Thus, an integral part of any P&O approach is the size of the perturbation, in this case a voltage step, applied by means of the PV power converter output voltage.

However, the P&O method has some limitations, including but not limited to oscillations around the MPP in steady state operation, slow response speed, and tracking in the wrong way under rapidly changing irradiance/atmospheric conditions. Such limitations often translate as a loss of maximum power output of the PV power system. In addition, in some instances, the PV system must coexist with other sources of energy. Thus, coordination between such sources is inevitable, typically in the form of subsystem priorities and/or capacity utilization rules.

Dual-sampling MPPT provides an improved P&O method with superior performance under dynamic atmospheric conditions, which reacts after a doubled-update time in order to select the correct operating point. More specifically, as shown in FIG. 2, a sequence of operating points is used to illustrate how the dual-sampling MPPT algorithm works. As shown, after the first sampling period, the algorithm calculates a power value and a delta power. This causes the PV cell(s) to operate at point A, after the PV power converter voltage incurs a positive delta step. Since the new power change is negative, the direction has to be reversed in order to pursue the MPP. The next decrement in voltage would have brought the operating point to B after time period $t_0$ to $t_1$, however, the sudden irradiance increment simultaneously with voltage step reduction leads to point C. It is important to note that the traditional MPPT interpretation is that a voltage reduction leads to increased power (i.e. $\Delta P_1$ is positive) and that the current operating point is moving upward in the curve following a target MPP. As such, a decrement in voltage is again necessary. This judgement is erroneous because effects of voltage and irradiance cannot be discriminated and actuated upon independently. As such, the dual-sampling MPPT algorithm waits for an additional updated power value (e.g. operating point D) and calculates a second delta power (e.g. $\Delta P_2$). If the power shift on the power-voltage curve is approximated as linear, the power change due only to the voltage step can be estimated by subtracting $\Delta P_2$ from $\Delta P_1$. Having a better approximation for the sole effect of stepping up the PV power converter output voltage allows for more effective MPP tracking. More specifically, still referring to FIG. 2 and assuming the effect was power to go down, the previous voltage step has to be reversed, taking operating conditions to the right of point D, after time interval $t_0$ to $t_2$. If irradiance continues to pull the power-voltage curve up and the same set of calculations continue to occur, the dual-sampling MPPT algorithm will steer the operating point from E to a target MPP.

As such, a system and method for integrating a dynamic MPPT algorithm for a PV system (such as the dual-sampling MPPT described above) with an external power constraint representing minimum available margins in components interconnecting PV sources with the rest of the system would be welcomed in the art. Accordingly, the present disclosure is directed to systems and methods for employing a variable voltage step as the MPPT voltage approaches the aforementioned external power constraint.

BRIEF DESCRIPTION

Aspects and advantages of the invention will be set forth in part in the following description, or may be obvious from the description, or may be learned through practice of the invention.

In one aspect, the present subject matter discloses a method for operating a PV system that is integrated into a power system connected to a power grid. The method includes determining a voltage operating point for the PV system based on a maximum power point tracking (MPPT) algorithm. If an available power output of the PV system can be provided to the power grid, the method includes operating the PV system based on the voltage operating point. If the maximum available power output of the PV system cannot be provided to the power grid, the method includes applying a voltage step to the voltage operating point to drive a power output of the PV system towards an external power constraint.

In one embodiment, the method includes applying the voltage step to an output voltage of a PV power converter of the PV system to drive the power output of the PV system towards the external power constraint. In such embodiments, the voltage step may correspond to a gain proportional to a difference between two power limit points as the difference approaches zero.

In another embodiment, the step of operating the PV system based on the voltage operating point may include maintaining the voltage step of the PV power converter of the PV system at a constant value. In further embodiments, the external power constraint(s) may correspond to a minimum available margin in one or more external components interconnecting the PV system with the power system. In such embodiments, the power system may be a wind turbine power system. Thus, the one or more external components may correspond to a power limiter of a power converter of the wind turbine power system. In further embodiments, the power system may include a gas turbine power system, an energy storage system, and/or any other power system or combinations thereof.

In several embodiments, the MPPT algorithm may include a single-sampling MPPT algorithm. In such embodiments, the MPPT algorithm may be based on a Perturb & Observe (P&O) algorithm. Alternatively, the MPPT algorithm may include a dual-sampling MPPT algorithm.

In another aspect, the present disclosure is directed to a hybrid power system connected to a power grid. The hybrid power system includes a wind turbine power system, a photovoltaic (PV) system integrated into the wind turbine power system, and a system controller communicatively coupled to the wind turbine power system and the PV system. The system controller is configured to perform one or more operations, including but not limited to determining a voltage operating point for the PV system based on a MPPT algorithm, if an available power output of the PV system can be provided to the power grid, operating the PV system based on the voltage operating point, and if the maximum available power output of the PV system cannot be provided to the power grid, applying a voltage step to the voltage operating point to drive a power output of the PV system towards an external power constraint.

In one embodiment, the wind turbine power system may include a power converter having a dynamic power limiter. In such embodiments, the power constraint may be equal to a power limitation of the power limiter. It should be understood that the hybrid power system may further include any of the additional features and/or steps described herein.

In yet another aspect, the present disclosure is directed to a method for operating a photovoltaic (PV) system that is integrated into a power system connected to a power grid. The method includes tracking a maximum power point of the PV system using a MPPT algorithm. Further, the method includes maintaining a voltage step of the PV system at a constant value as long as the maximum power point of the MPPT algorithm does not intersect external power constraints of the power system. However, if the maximum power point of the MPPT algorithm intersects the external power constraints of the power system, the method includes applying a voltage step to an output voltage of a PV power converter of the PV system. It should be understood that the hybrid power system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
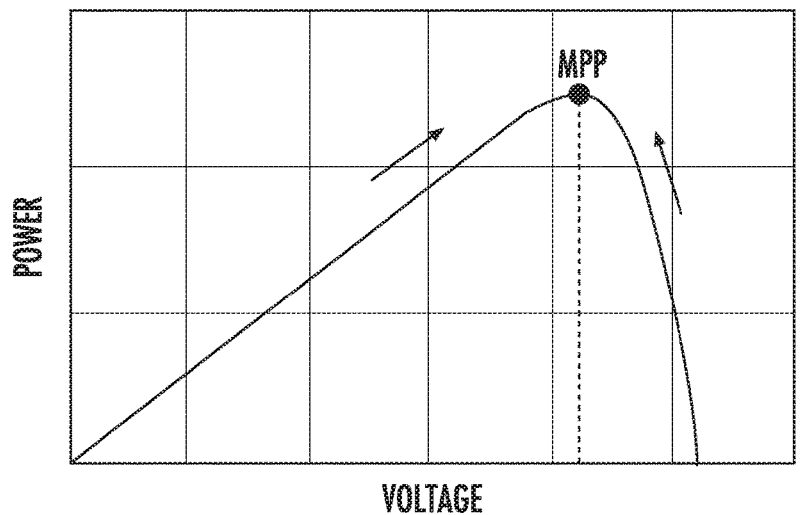
FIG. 1 illustrates a graph of one embodiment of power (y-axis) versus voltage (x-axis) for a PV system that is being operated according to a single-sample MPPT algorithm.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 3:
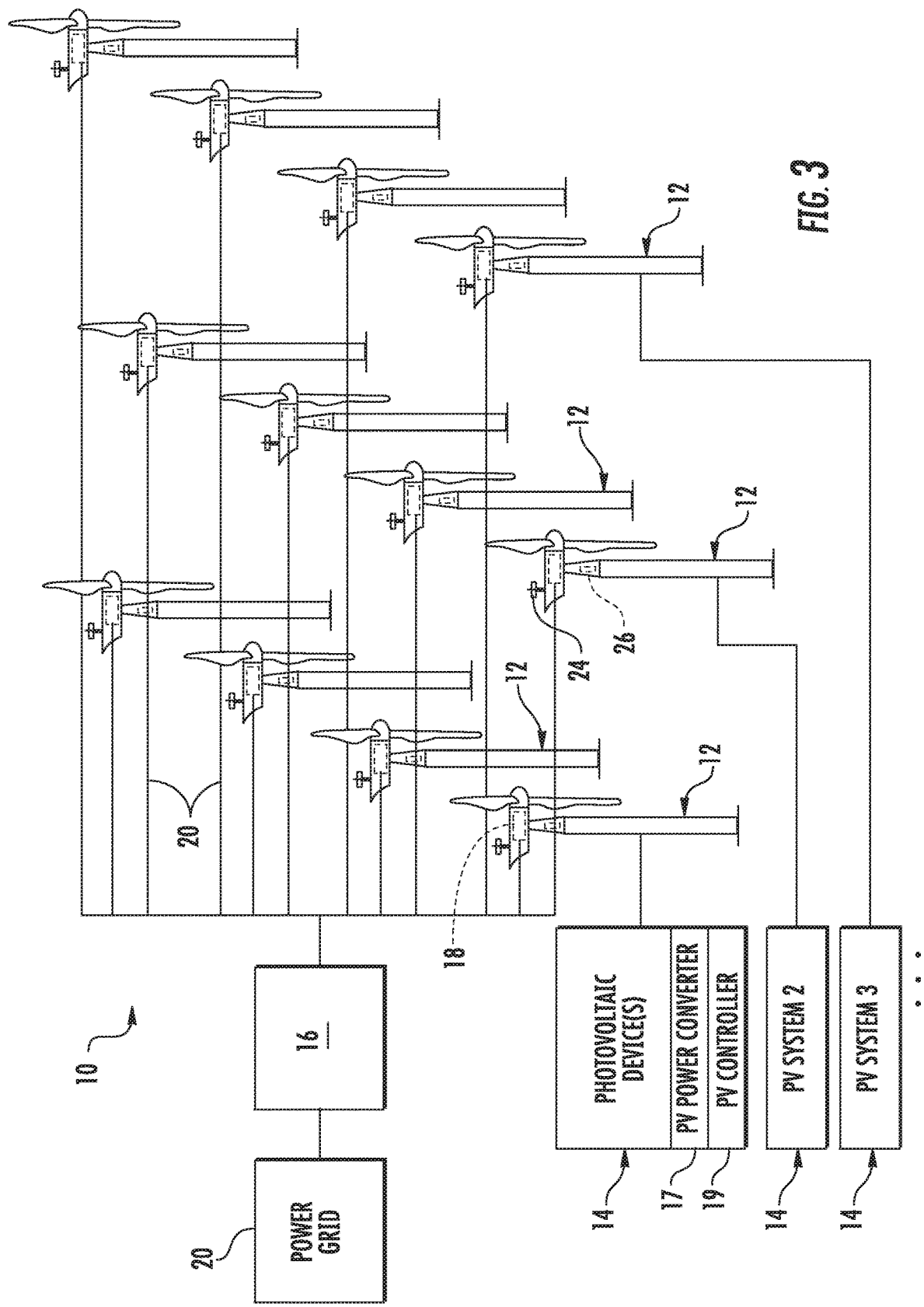
FIG. 3 illustrates a schematic diagram of one embodiment of a hybrid power system that includes a wind farm and a PV system according to the present disclosure.

Referring to the drawings, FIG. 3 illustrates schematic diagram of one embodiment of a hybrid power system 10 connected to a power grid 22 according to the present disclosure. As shown in the illustrated embodiment, the hybrid power system 10 includes a plurality of wind turbines 12, a plurality photovoltaic (PV) system 14, and system controller 16. More specifically, as shown, one or more of the wind turbines 12 may be separately coupled to a set of PV systems 14 (only one of which is shown). In addition, as shown in the illustrated embodiment, the hybrid power system 10 includes twelve wind turbines 12. However, in other embodiments, the hybrid power system 10 may include any other number of wind turbines 12, such as less than twelve wind turbines 12 or greater than twelve wind turbines 12. In addition, as shown, each of the PV systems 14 may include any suitable number PV devices 15 or solar modules, a PV power converter 17, and a PV controller 19. Further, in typical embodiments, each PV device 15 may include a solar panel having a plurality of solar cells, which generate electrical power through the conversion of light into electricity using, e.g. semiconductor materials that exhibit the photovoltaic effect.

Further, as shown, the system controller 16 may be communicatively coupled to the PV system(s) 14 (particularly the PV controller 19) as well as to the wind turbines 12 via their respective individual turbine controllers 18 through a wired connection, such as through suitable communicative links 20 or networks (e.g., a suitable cable). Alternatively, the system controller 16 may be communicatively coupled to the PV system(s) 14 and/or to the turbine controllers 18 through a wireless connection, such as by using any suitable wireless communications protocol known in the art. In addition, the system controller 16 may be generally configured similar to the turbine controllers 18 for each of the individual wind turbines 12 within the hybrid power system 10.

Further, as shown, the system controller 16 may be communicatively coupled to the PV system 14 (particularly the PV controller 19) as well as to the wind turbines 12 via their respective individual turbine controllers 18 through a wired connection, such as through suitable communicative links 20 or networks (e.g., a suitable cable). Alternatively, the system controller 16 may be communicatively coupled to the PV system 14 and/or to the turbine controllers 18 through a wireless connection, such as by using any suitable wireless communications protocol known in the art. In addition, the system controller 16 may be generally configured similar to the turbine controllers 18 for each of the individual wind turbines 12 within the hybrid power system 10.

Still referring to FIG. 3, each of the wind turbines 12 may include also include one or more sensors, for example, sensors 24, 26. As such, the sensors 24, 26 are configured to measure a variety of parameters including, without limitation, operating and/or environmental conditions. For example, as shown, the wind turbines 12 includes a wind sensor 24, such as an anemometer or any other suitable device, configured for measuring wind speeds or any other wind parameter. The wind parameters include information regarding at least one of or a combination of the following: a wind gust, a wind speed, a wind direction, a wind acceleration, a wind turbulence, a wind shear, a wind veer, a wake, SCADA information, or similar. Further, the wind turbines 12 may also include one or more additional sensors for monitoring additional operational parameters thereof. Further, each sensor 24, 26 may be an individual sensor or may include a plurality of sensors. The sensors 24, 26 may be any suitable sensor having any suitable location within or remote to wind turbine 12 that allows the wind turbine 12 to function as described herein. In some embodiments, the sensors 24, 26 are coupled to one of the controllers 16, 18 described herein for transmitting measurements to the controllers for processing thereof.

Figure 4:
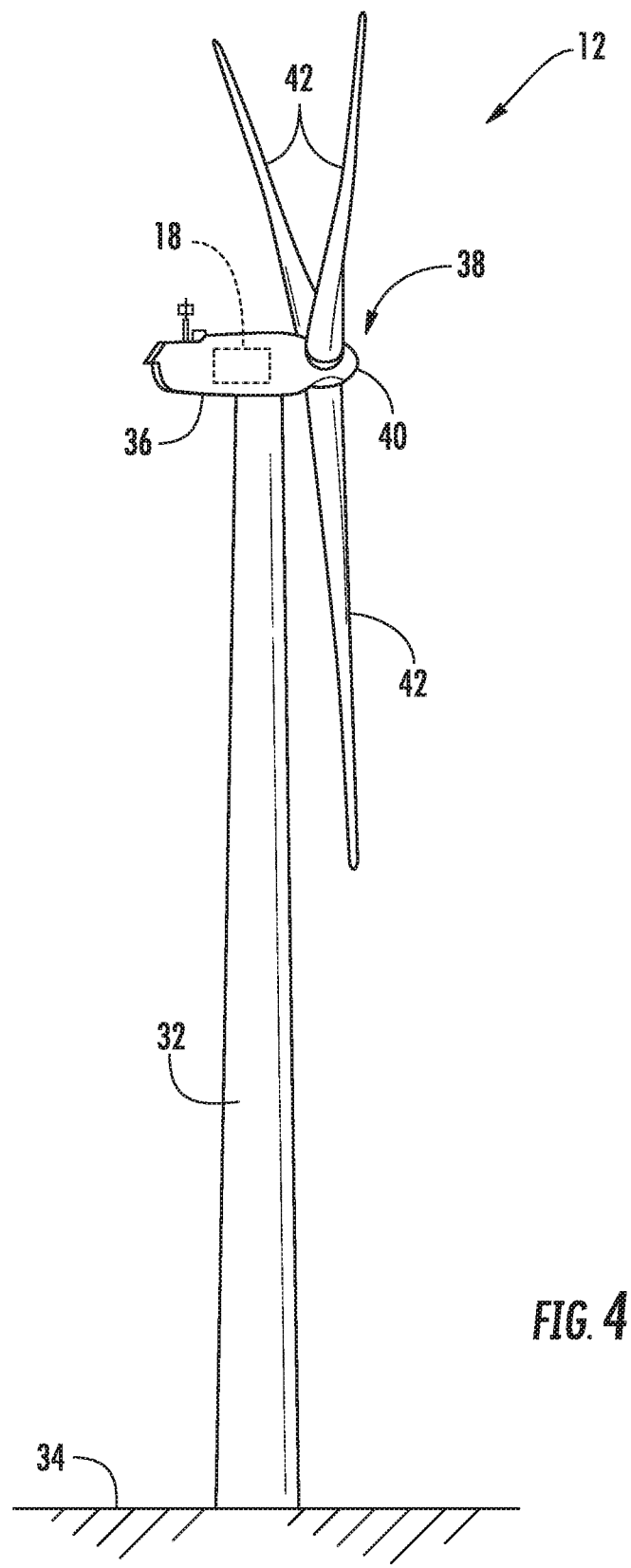
FIG. 4 illustrates a perspective view of one embodiment of a wind turbine according to the present disclosure.

Referring now to FIG. 4, each wind turbine 12 generally includes a tower 32 extending from a support surface 34, a nacelle 36 mounted on the tower 32, and a rotor 38 coupled to the nacelle 36. The rotor 38 includes a rotatable hub 40 and at least one rotor blade 42 coupled to and extending outwardly from the hub 40. For example, in the illustrated embodiment, the rotor 38 includes three rotor blades 42. However, in an alternative embodiment, the rotor 38 may include more or less than three rotor blades 42. Each rotor blade 42 may be spaced about the hub 40 to facilitate rotating the rotor 38 to enable kinetic energy to be transferred from the wind into usable mechanical energy, and subsequently, electrical energy. For instance, the hub 40 may be rotatably coupled to an electric generator 25 (FIG. 5) positioned within the nacelle 36 to permit electrical energy to be produced. In addition, as shown, the turbine controller 18 described herein may be centralized within the nacelle 36. However, it should be appreciated that the turbine controller 18 may be disposed at any location on or in the wind turbine 12, at any location on the support surface 34 or generally at any other location.

Figure 5:
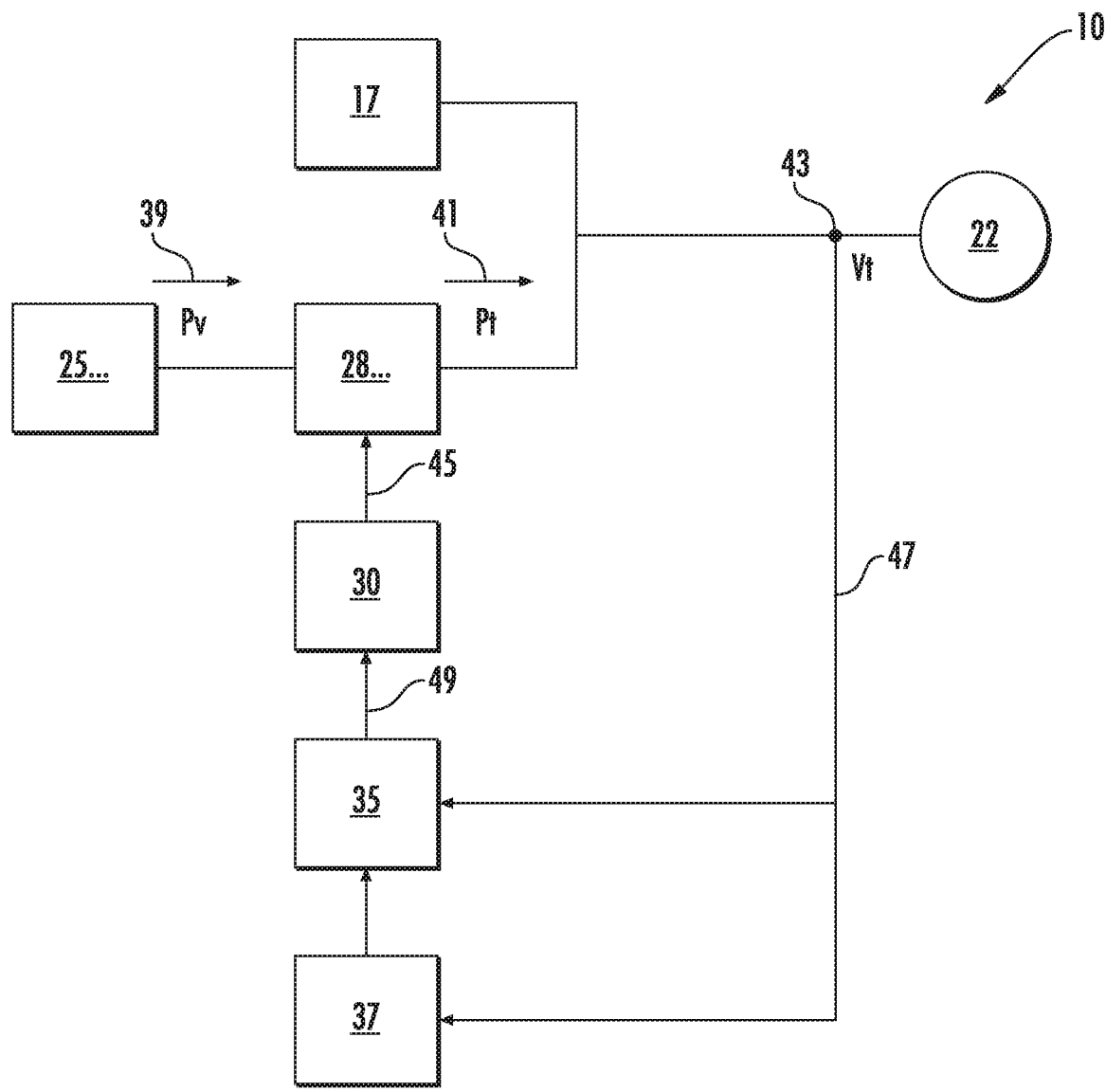
FIG. 5 illustrates a block diagram of one embodiment of the hybrid power system according to the present disclosure.

Referring now to FIG. 5, a block diagram of one embodiment of the hybrid power system 10 of the present disclosure is illustrated. As shown, the hybrid power system 10 includes an energy source, for example, the generators 25 of the wind turbines 12. The system 10 also includes the turbine power converter(s) 28 that receives variable frequency electrical power 39 generated by the generator(s) 25 and converts the electrical power 39 to a terminal power 41 suitable for transmission over the grid 22. Further, as shown, the turbine power converter(s) 28 is configured to receive control signals 45 from a converter interface controller 30. As such, the control signals 45 are based on sensed operating conditions or operating characteristics of the power system 10 as described herein and used to control the operation of the turbine power converter(s) 28. Examples of measured operating conditions may include, but are not limited to, a terminal grid voltage ($V_t$) 43, a PLL error, a stator bus voltage, a rotor bus voltage, and/or a current. For example, as shown, the terminal voltage ($V_t$) 43 may be measured at a node between the power converter 28 and the utility grid 22. Thus, as shown, a grid voltage feedback signal 47 represented of the terminal voltage ($V_t$) 43 may be sent to a power limiter 35 and/or a phase-locked loop 37. Accordingly, the power limiter 35 can generate a power command signal 49 based at least partially on the feedback signal 47 and transmit power command signal 49 to the converter interface controller 30.

The various controllers 16, 18, 19, 30 described herein may generally comprise as any suitable processing unit configured to perform the methods, steps, operations, calculations and the like described herein. Thus, in several embodiments, the controllers 16, 18, 19, 30 may include suitable computer-readable instructions that, when implemented, configure the controllers 16, 18, 19, 30 to perform various different actions, such as transmitting and executing wind turbine control signals and/or commands. By transmitting and executing system control signals and/or commands, the controllers 16, 18, 19, 30 may generally be configured to control the various operating modes (e.g., start-up or shut-down sequences) and/or components of the hybrid power system 10.

Figure 6:
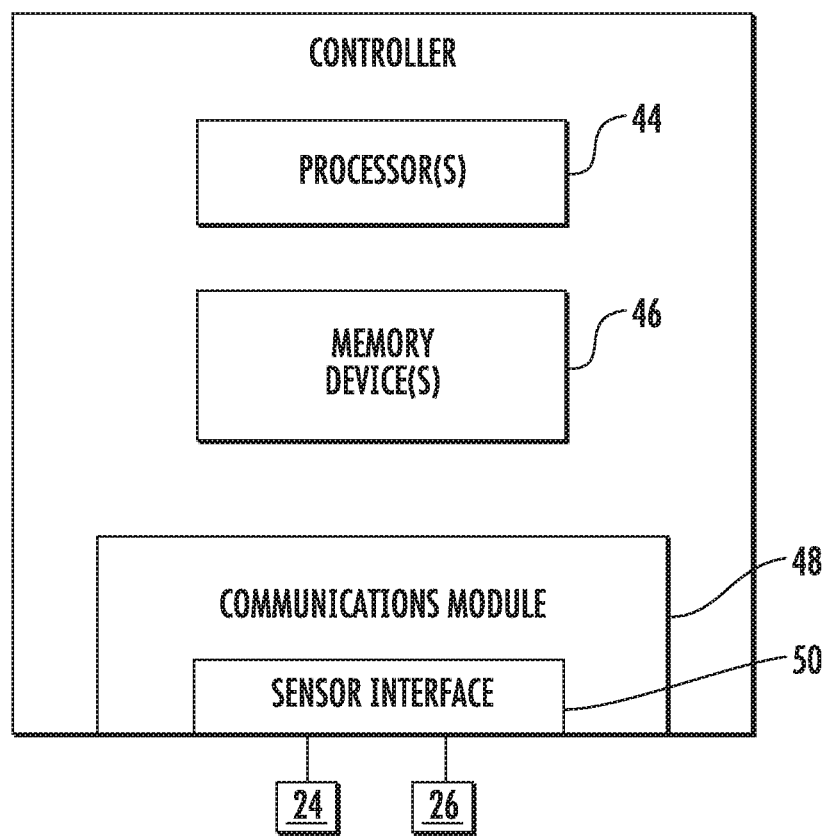
FIG. 6 illustrates a schematic diagram of one embodiment of a controller according to the present disclosure.

Referring now to FIG. 6, there is illustrated a block diagram of one embodiment of a controller, such as one of the controllers 16, 18, 19, 30 described herein. In general, each of the controllers 16, 18, 19, 30 may comprise a computer or any other suitable processing unit. Thus, in several embodiments, each of the controllers 16, 18, 19, 30 may include one or more processor(s) 44 and associated memory device(s) 46 configured to perform a variety of computer-implemented functions (e.g., performing the methods, steps, operations, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 46 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 46 may generally be configured to store suitable computer-readable instructions that, when implemented by the processor(s) 44 of the controllers 16, 18, 19, 30 configure the controllers 16, 18, 19, 30 to perform various functions. The memory device(s) 46 may also be used to store temporary input and output variables and other immediate information during execution by the processor(s) 44 of the computer-readable instructions.

Additionally, as shown, each of the controllers 16, 18, 19, 30 may also include a communications module 48 to facilitate communication between each of the controllers 16, 18, 19, 30 and the various components of the hybrid power system 10. In several embodiments, the communications module 48 may include a sensor interface 50 to permit the sensors 24, 26 of the hybrid power system 10 to transmit output data (e.g., operating temperature measurements, power output measurements and the like) to each of the controllers 16, 18, 19, 30. Thus, as shown, each sensor 24, 26 may be communicatively coupled to each of the controllers 16, 18, 19, 30 through the sensor interface 50. For instance, in one embodiment, the sensors 24, 26 may be communicatively coupled to the sensor interface 50 through a wired connection, such as by coupling the sensors 24, 26 to the sensor interface 50 through a cable or other suitable communicative link. Alternatively, the sensors 24, 26 may be communicatively coupled to the sensor interface 50 through a wireless connection. For example, each sensor 24, 26 may be equipped with a suitable antenna for transmitting output data to each of the controllers 16, 18, 19, 30 through any suitable wireless communications protocol. In such an embodiment, the communications module 48 may also include a suitable antenna for receiving the data transmissions and/or for otherwise wirelessly communicating with the sensors 24, 26. It should be appreciated that a suitable sensor interface 50 may include, for instance, one or more analog-to-digital converters configured to convert analog signals into digital signals that can be used by the processor(s) 44 of the controllers 16, 18, 19, 30.

Figure 2:
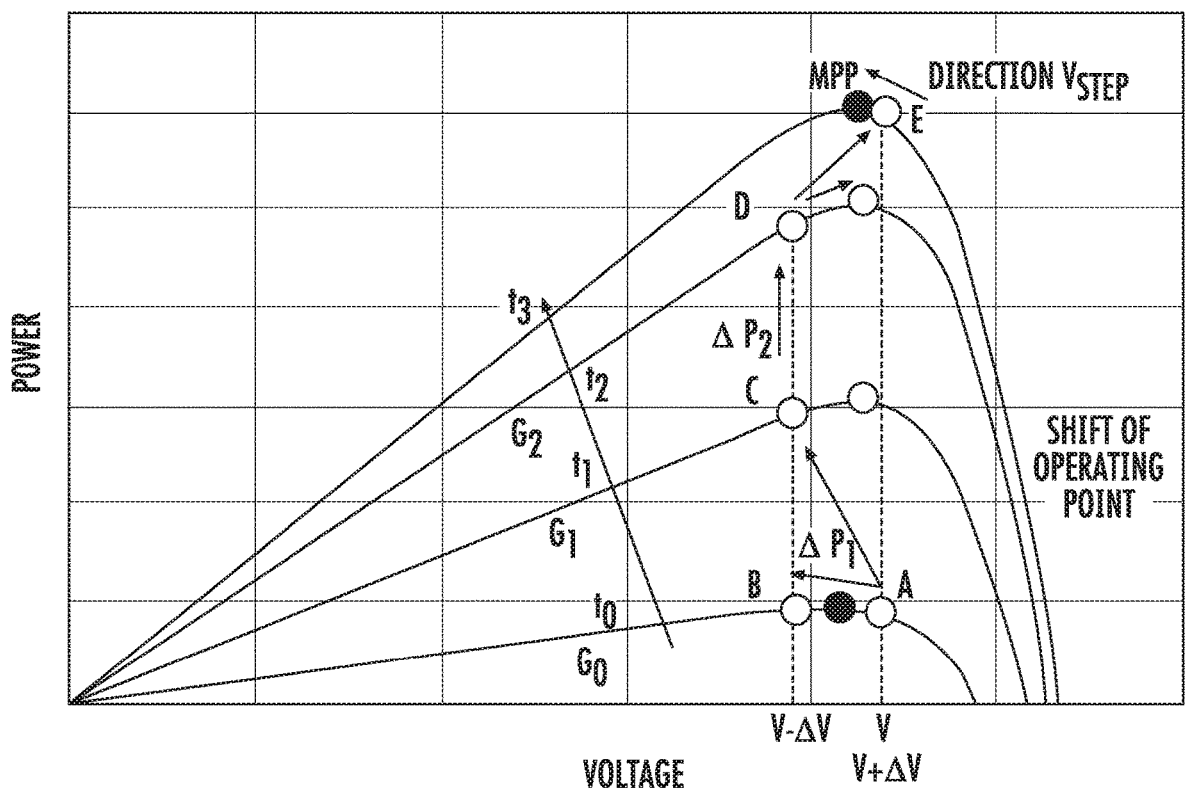
FIG. 2 illustrates a graph of one embodiment of power (y-axis) versus voltage (x-axis) for a PV system that is being operated according to a dual-sample MPPT algorithm.
Figure 7:
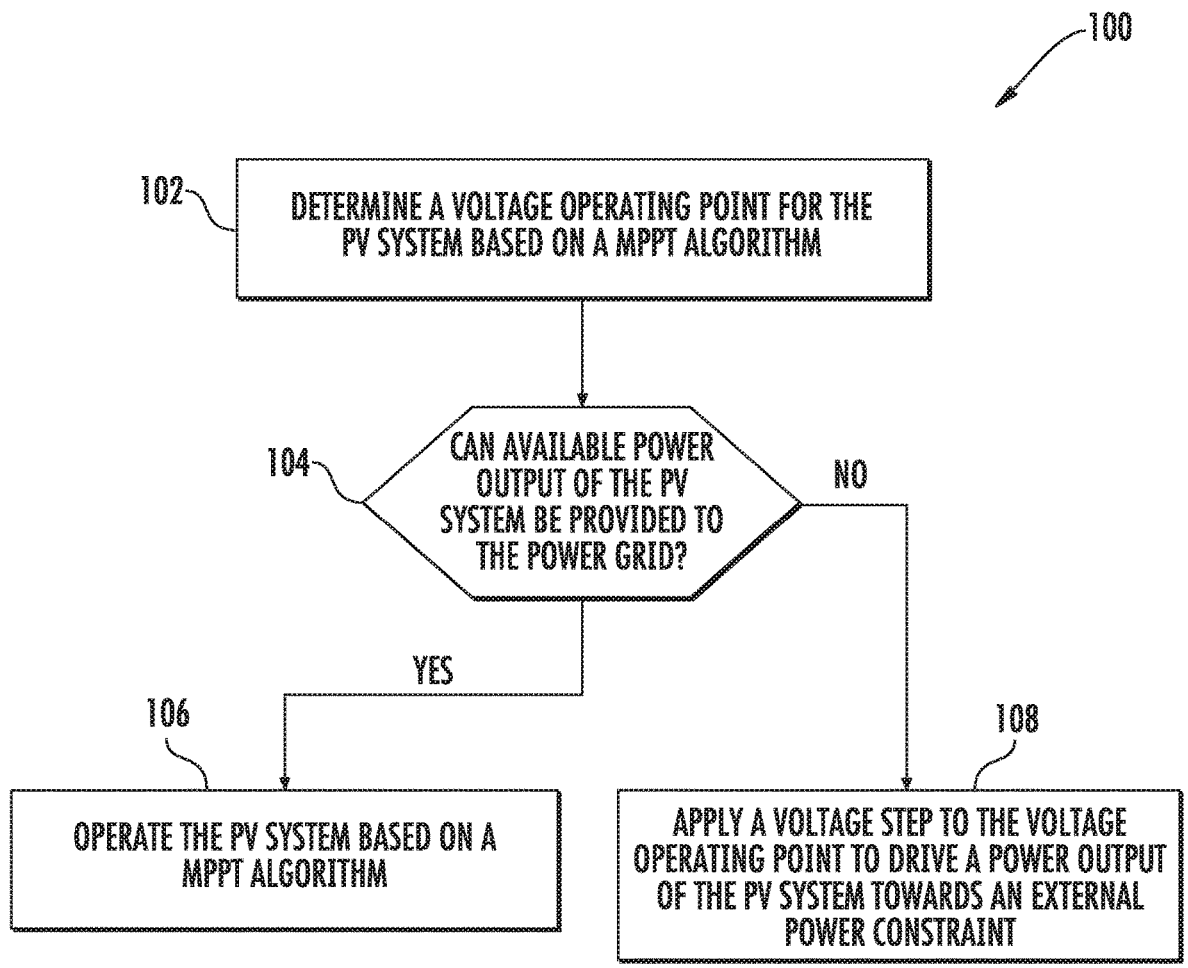
FIG. 7 illustrates a flow diagram of one embodiment of a method for operating a PV system that is integrated into a wind turbine connected to a power grid according to the present disclosure.
Figure 8:
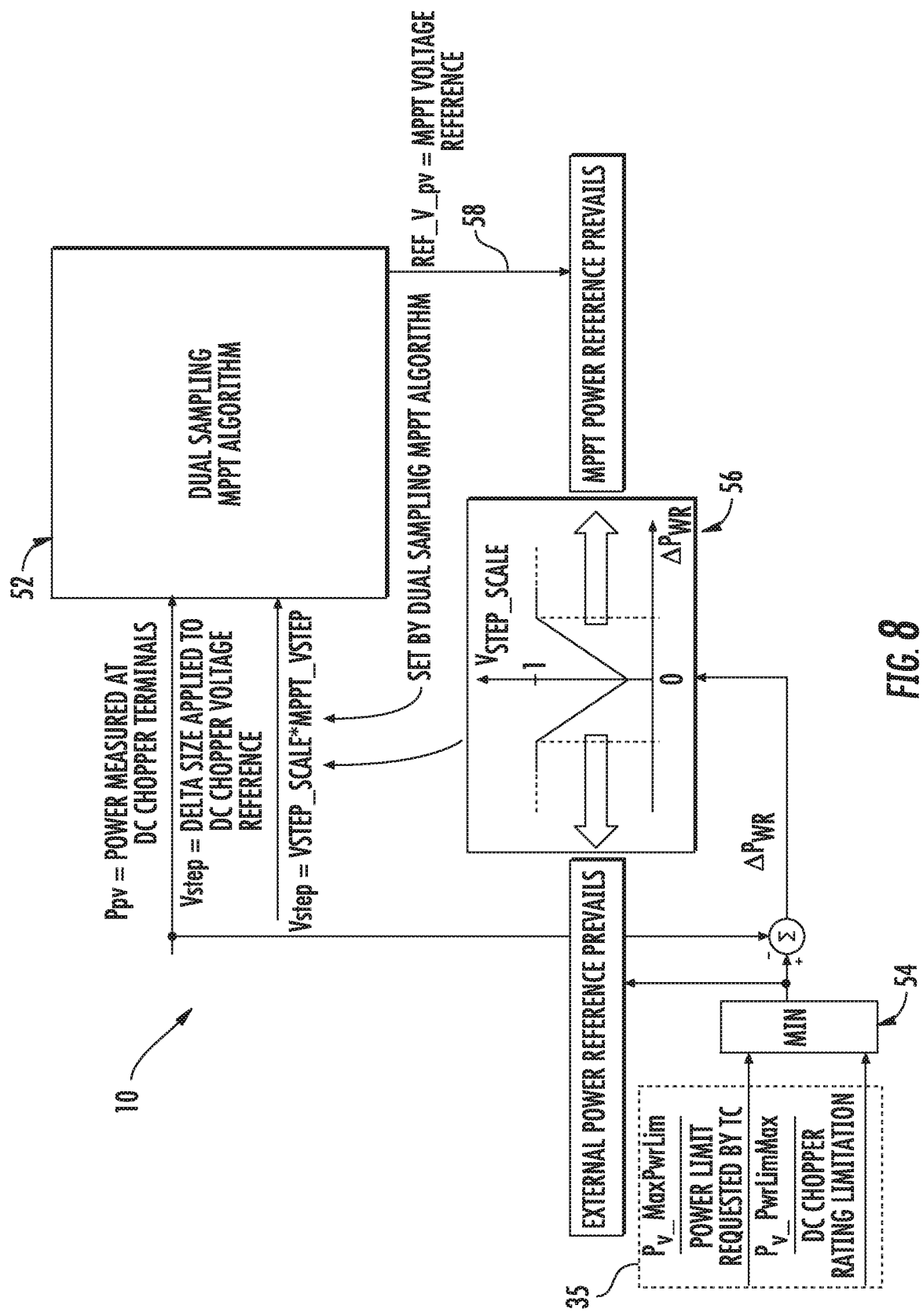
FIG. 8 illustrates a flow chart of one embodiment of interfacing aspects of the hybrid power system according to the present disclosure, particularly illustrating the power limiter of the wind turbine(s) interfacing with the dual-sampling MPPT of the PV system.

Referring now to FIG. 7, a flow diagram of one embodiment of a method for operating at least one PV system that is integrated into a power system connected to a power grid, such as the PV systems 14 of FIG. 3, is illustrated. As shown at 102, the method 100 includes determining a voltage operating point for the PV system 14 based on a MPPT algorithm. For example, in one embodiment, the MPPT algorithm may include a single-sampling MPPT algorithm. In such embodiments, the MPPT algorithm may be based on a Perturb & Observe (P&O) algorithm. In alternative embodiments, as shown in FIG. 8, the MPPT algorithm may include a dual-sampling MPPT algorithm 52, which is further explained and described in reference to FIG. 2 herein. In addition, as shown, the MPPT algorithm 52 receives various inputs, such as the power (e.g. $P_{PV}$) measured at the DC chopper terminals of the power converter 28 and/or the voltage step $V_{STEP}$ (i.e. the delta size applied to the DC chopper voltage reference, every first half of the algorithm is executed). Thus, as shown, the output of the MPPT algorithm 52 is the MPPT voltage reference (e.g. ref_V_pv).

As shown at 104, the method 100 includes determining whether all available power output of the PV system 14 can be provided to the power grid. If so, as shown at 106, the method 100 includes operating the PV system 14 based on the voltage operating point. More specifically, in such embodiment, the PV controller 19 may be configured to maintain the output voltage of the PV power converter 17 of the PV system 14 at a constant value.

If all available power output of the PV system 14 cannot be provided to the power grid 22, as shown at 108, the method 100 includes applying a voltage step to the voltage operating point to drive a power output of the PV system 14 towards an external power constraint. More specifically, as shown in FIG. 8, the method 100 may include applying the voltage step 56 to an output voltage of the PV power converter 17 of the PV system 14 to drive the power output of the PV system 14 towards the external power constraint. Thus, the voltage step 56 is utilized when transitioning between the dynamic power limit and the MPPT target. In such embodiments, the voltage step 56 may correspond to a gain that changes linearly with power difference between the PV converter output and the external constraint reference, as difference approaches zero.

In further embodiments, the external power constraint(s) may correspond to a minimum available margin in one or more external components interconnecting the PV devices 14 with each of the wind turbines 12 of the hybrid power system 10. For example, as shown in FIG. 8, the external component(s) may correspond to the power limiter 35 of the wind turbine power system 12. More specifically, as shown at 54, the turbine controller (TC) generates a power limit or target independently of DC chopper rating limitations, thus the lesser of the two in the power limiter 35 becomes a reference external to the MPPT logic.

Figure 9:
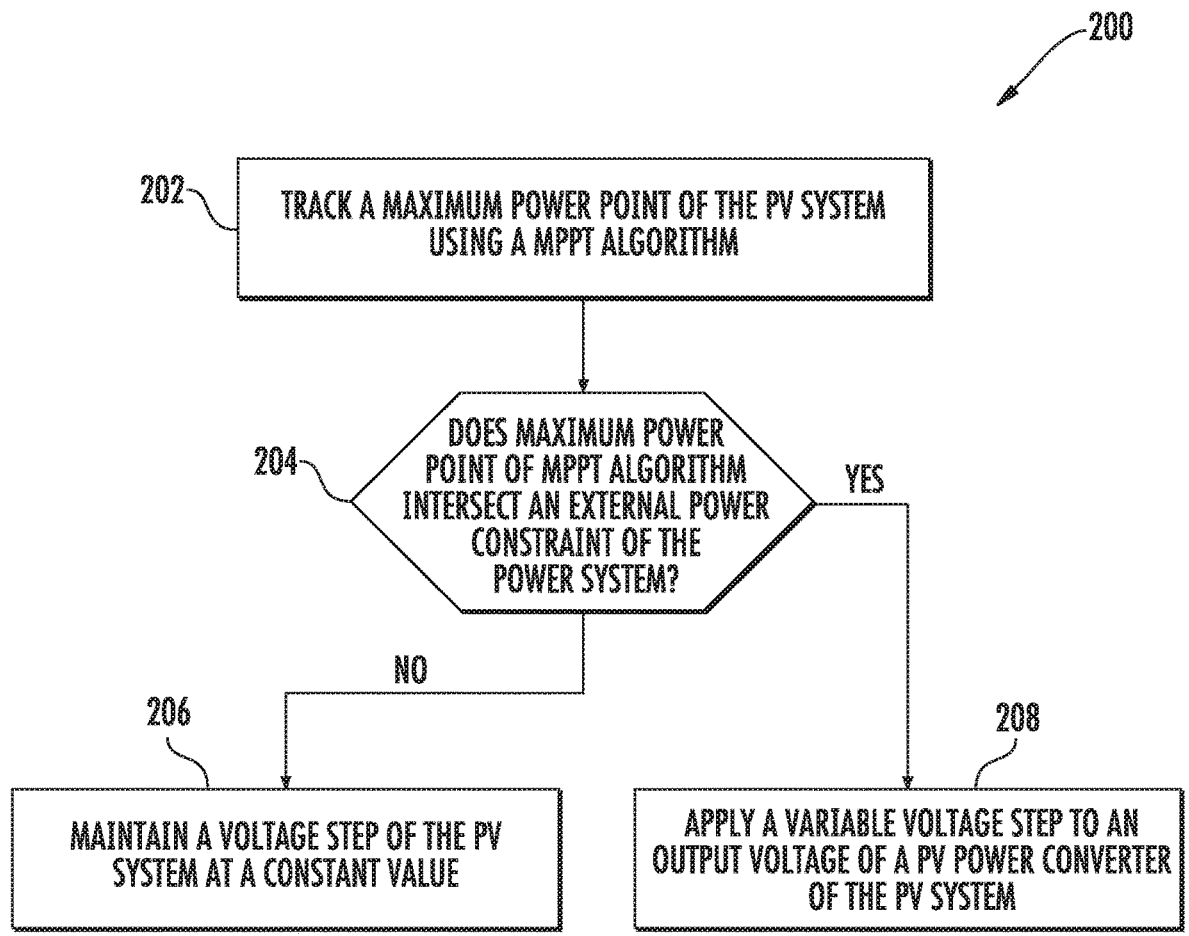
FIG. 9 illustrates a flow diagram of another embodiment of a method for operating a PV system that is integrated into a wind turbine connected to a power grid according to the present disclosure.

Referring now to FIG. 9, a flow diagram of another embodiment of a method 200 for operating the PV system 14 that is integrated into a wind turbine power system connected to a power grid is illustrated. As shown at 202, the method 200 includes tracking a maximum power point of the PV system 14 using a MPPT algorithm. As shown at 204, the method 200 includes maintaining a voltage step of the PV system 14 at a constant value as long as the maximum power point of MPPT algorithm does not intersect external power constraints of the power system. If the maximum power point of the MPPT algorithm intersects the external power constraints of the power system (i.e. the maximum power point becomes equal to or larger than the power constraint thereby making the delta-power used by the voltage step generator 56 a negative value), as shown at 206, the method 200 includes applying a voltage step to an output voltage of a PV power converter of the PV system 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a photovoltaic (PV) system that is integrated into a power system connected to a power grid, the method comprising:

determining a voltage operating point for the PV system based on a maximum power point tracking (MPPT) algorithm;

if an available power output of the PV system can be provided to the power grid, operating the PV system based on the voltage operating point; and, if the maximum available power output of the PV system cannot be provided to the power grid, applying a voltage step to the voltage operating point to drive a power output of the PV system towards an external power constraint.

2. The method of claim 1, further comprising applying the voltage step to an output voltage of a PV power converter of the PV system to drive the power output of the PV system towards the external power constraint.

3. The method of claim 2, wherein the voltage step comprises a gain proportional to a difference between two power limit points as the difference approaches zero.

4. The method of claim 2, wherein operating the PV system based on the voltage operating point further comprises maintaining the voltage step of the PV power converter of the PV system at a constant value.

5. The method of claim 1, wherein the external power constraint comprises a minimum available margin in one or more external components interconnecting the PV system with the power system.

6. The method of claim 5, wherein the power system comprises a wind turbine power system, gas turbine power system, an energy storage system, or combinations thereof.

7. The method of claim 6, wherein the one or more external components comprises a power limiter of a power converter of the wind turbine power system.

8. The method of claim 1, wherein the MPPT algorithm comprises a single-sampling MPPT algorithm.

9. The method of claim 8, wherein the MPPT algorithm is based on a Perturb & Observe (P&O) algorithm.

10. The method of claim 1, wherein the MPPT algorithm comprises a dual-sampling MPPT algorithm.

11. A hybrid power system connected to a power grid, comprising:
a wind turbine power system;
a photovoltaic (PV) system integrated into the wind turbine power system; and,
a system controller communicatively coupled to the wind turbine power system and the PV system, the system controller configured to perform one or more operations, the one or more operations comprising:
determining a voltage operating point for the PV system based on a maximum power point tracking (MPPT) algorithm;
if an available power output of the PV system can be provided to the power grid, operating the PV system based on the voltage operating point; and,
if the maximum available power output of the PV system cannot be provided to the power grid, applying a voltage step to the voltage operating point to drive a power output of the PV system towards an external power constraint.

12. The hybrid power system of claim 11, wherein the wind turbine power system further comprises a power converter comprising a dynamic power limiter, wherein the power constraint is equal to a power limitation of the power limiter.

13. The hybrid power system of claim 11, wherein the one or more operations further comprise applying the voltage step to an output voltage of a PV power converter of the PV system to drive the power output of the PV system towards the external power constraint.

14. The hybrid power system of claim 11, wherein operating the PV system based on the voltage operating point further comprises maintaining the voltage step of the PV power converter of the PV system at a constant value.

15. The hybrid power system of claim 11, wherein the power constraint comprises a minimum available margin in one or more external components interconnecting the PV system with the wind turbine power system.

16. A method for operating a photovoltaic (PV) system that is integrated into a power system connected to a power grid, the method comprising:
tracking a maximum power point of the PV system using a maximum power point tracking (MPPT) algorithm;
maintaining a voltage step of the PV system at a constant value as long as the maximum power point of the MPPT algorithm does not intersect external power constraints of the power system; and,
if the maximum power point of the MPPT algorithm intersects one or more of the external power constraints of the power system, applying a variable voltage step to an output voltage of a PV power converter of the PV system.

17. The method of claim 16, wherein the external power constraints comprise a minimum available margin in one or more external components interconnecting the PV system with the power system.

18. The method of claim 17, wherein the power system comprises a wind turbine power system, gas turbine power system, an energy storage system, or combinations thereof.

19. The method of claim 18, wherein the one or more external components comprises a power limiter of a power converter of the wind turbine power system.

20. The method of claim 16, wherein the MPPT algorithm comprises a dual-sampling MPPT algorithm.

* * * * *